(No Model.)
G. WILKINSON.
DERRICK NET FOR STACKING.
No. 264,915. Patented Sept. 26, 1882.
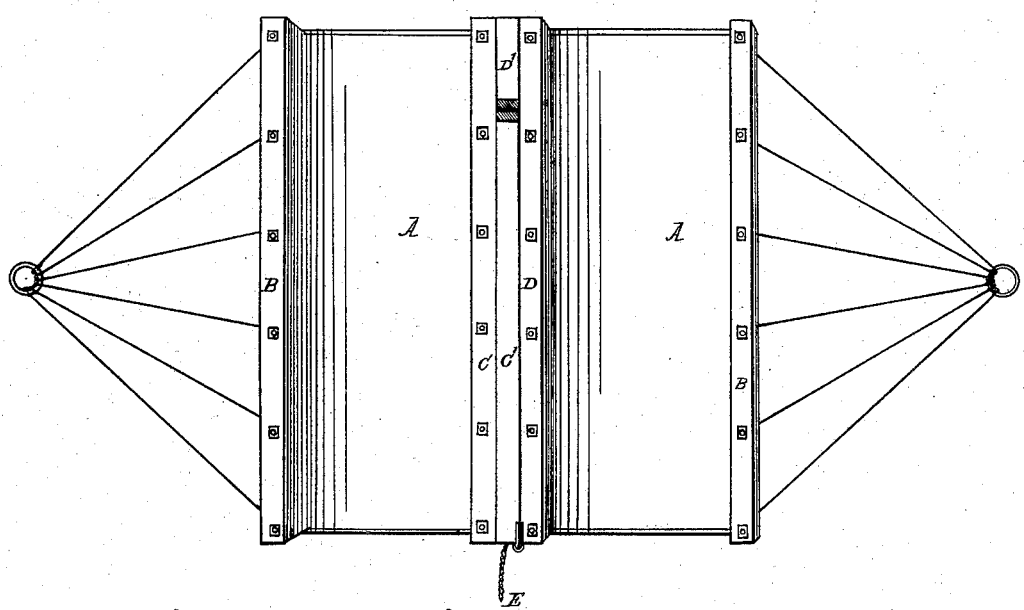
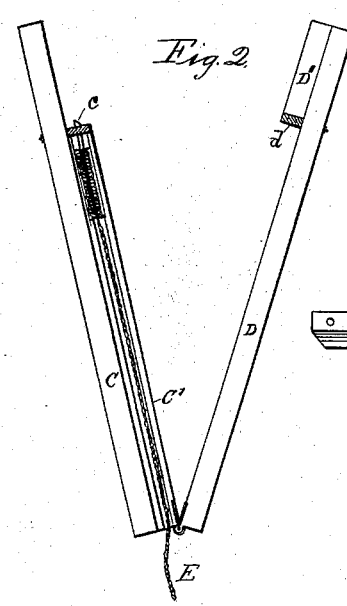
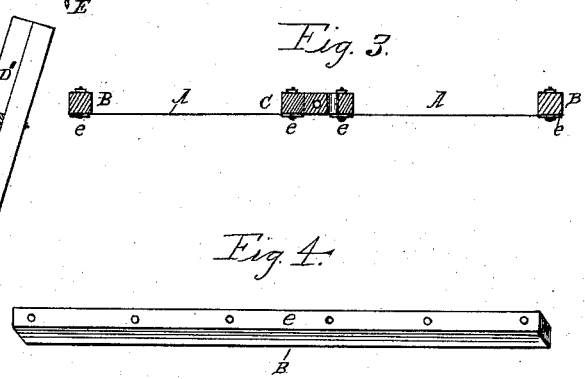
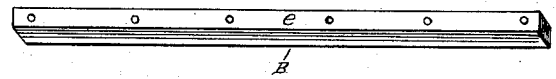
Witnesses,
Elihu P. Stowe
Thos. J. Kennedy
Inventor.
George Wilkinson.
By Joshua B. Webster
Attorney.

UNITED STATES PATENT OFFICE.

GEORGE WILKINSON, OF ACAMPO, CALIFORNIA.

DERRICK-NET FOR STACKING.

SPECIFICATION forming part of Letters Patent No. 264,915, dated September 26, 1882.

Application filed July 1, 1882. (No model.)

*To all whom it may concern:*

Be it known that I, GEORGE WILKINSON, a citizen of the United States, residing at Acampo, in the county of San Joaquin and State of California, have invented certain new and useful Improvements in Derrick-Nets for Stacking; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain improvements in that class of agricultural implements extensively used in the State of California as false bottoms of header-wagon beds, upon which false bottoms are deposited the cut-grain straw, which is poured thereon from the conveyers or drapers of the spouts of heading-machines in the harvest-field. These false bottoms are termed among farmers "derrick-nets."

My invention consists in the combination of the two sections of the net in a peculiar manner, both sections being of equal size, by means of a hinge at the one end of the two inside holding-bars and by a spring-latch at the other ends thereof; also, in securing the bottoms of canvas, rope, or other suitable material to the holding-bars by iron straps bolted to said holding-bars, all as will be more fully described hereinafter.

Referring to the accompanying drawings, Figure 1 is a perspective of a complete net with sections united. Fig. 2 is a view of the inner bars, showing the hinge and spring-latch by which they are united. Fig. 3 is a vertical section of my invention. Fig. 4 is a view of one of the bars with iron strap bolted thereto.

A A are the sections of my improved net, having outside bars, B B, and inside bars composed of bar C, having shorter bar C' bolted thereto, with spring-latch $c$ at its head, and of bar D, having short bar D' bolted thereto, with spring-latch eye $d$ at its foot. The canvas or rope bottoms of the sections are attached to the bottoms of the bars by iron straps $e\ e\ e\ e$. A slip or pulling cord, E, connects with spring-latch $c$, at its rear, through a circular orifice the entire length of bar C', and is of sufficient length to be within easy reach of the operator.

The method of using my improved net is as follows: It is spread in the bottom of the bed of the header-wagon, both sections of course being united, as hereinbefore stated. As soon as a sufficient load of grain-straw is received from the heading-machine the ropes usually attached to bars B B, as shown in Fig. 1, and having rings or eyes at their extremities, are by such rings connected to the hooks of blocks of the raising-tackles. The load is then raised to and over the point of discharge. The cord E is pulled by the operator, releasing the latch $c$ from its eye $d$, whereupon the two sections of the net fly outward from the inner points of bars C and D', the lower inner points of said bars C' and D being of course held together by their hinge, as hereinbefore shown. The load then discharges, after which the two sections of the net are brought together again and latched, and the operation, as previously described, is repeated. The iron straps $e\ e\ e\ e$ insure greath strength, and also prevent chafing of the canvas or rope bottoms of the net. For carriage, both sections can be rolled up compactly and into a small compass.

I am aware that similar nets with hinge at one end of inside bars and catch or latch at the other have long been in use. Hence

What I claim as new, and desire to secure by Letters Patent, is—

1. A derrick-net for stacking purposes, composed of the section A, having an outside bar, B, and an inside bar, C, having attached to it a bar, C', carrying spring-latch $c$ at its head, and cord E, and of the section A, having an outside bar, B, and an inside bar, D, having attached to it a bar, D', carrying spring-latch eye $d$ at its foot, the said sections A A being permanently secured together at lower inside corners by hinge at end of bars C' and D and at upper ends by latch $c$ and its eye $d$, located as shown, said latch $c$ having a trip-cord, E, attached to it and extending therefrom down through circular hole in bar C' to within easy reach of the operator, all arranged and operating substantially as herein set forth and described.

2. The combination, with the bar C, of the bar C', having a spring-latch, $c$, at its head, and a cord, E, extending from said latch down through a circular hole in bar C', and extending beyond it, so as to be within reach of the operator, all for the purposes substantially as herein described.

3. The combination of the bar D with the bar D', having at its foot spring-latch eye $d$ to receive spring-latch $c$, all substantially for the purposes herein described and set forth.

4. The combination, with bars B B, C, and D, of iron straps bolted thereto and securing canvas or rope netting of sections A A, as and for the purposes herein described and set forth.

In testimony whereof I affix my signature in presence of two witnesses.

GEORGE WILKINSON.

Witnesses:
ELIHU B. STOWE,
JOSHUA B. WEBSTER.